Patented May 19, 1953

2,639,278

UNITED STATES PATENT OFFICE 2,639,278

METHOD OF PREPARING FINELY DIVIDED NYLON POWDER

Louis L. Stott, Reading, Pa., and Laurence R. B. Hervey, West Concord, Mass., assignors, by direct and mesne assignments, to The Polymer Corporation, Reading, Pa., a corporation of Pennsylvania No Drawing. Application December 22, 1950, Serial No. 202,405

11 Claims. (Cl. 260—78)

This invention relates to reducing synthetic linear polyamides to a finely divided state and more particularly to methods of treating such polyamides with polyhydric alcohols to form such finely divided polymer particles.

The synthetic linear polyamides with which this invention is concerned are the type described in United States Patents Nos. 2,071,250, 2,071,253 and 2,130,948, and particularly those which are normally considered insoluble in simple alcohols. These polymers are referred to herein by the generic term nylon.

Solvents for synthetic linear polyamides are known. The normally alcohol-insoluble types such as polyhexamethylene adipamide and polyhexamethylene sebacamide may be dissolved in solvents such as phenols and strong mineral acids, but such solvents are of no value in our process since as the solvent is removed, the solution gradually changes from a gel to a tough mass rather than to finely divided workable material.

While virgin nylon may be used in carrying out the present invention, waste nylon may also be used advantageously and provides an inexpensive source of nylon. Waste and scrap nylon are available from several sources—e. g. rejects during manufacture, turnings from machining of solid nylon shapes, skeleton scrap resulting when parts are stamped from nylon strips, trimmings from the cutting of nylon fabrics, and used nylon cloth and articles. If this scrap and waste is absolutely clean, it can be remelted under controlled conditions and used over again, but often such material is contaminated with foreign materials such as dirt, oil, grease, or floor sweepings, or it may contain unwanted impurities such as cotton thread, delusterants, etc. Oils, dust and other surface contaminants may be removed by proper washing. Other contaminating materials, such as other fibers, delusterants, and metal particles may be removed by dissolving the nylon waste and filtering, but none of the solvents now known is fully satisfactory for this purpose since such solvents introduce materials which are difficult to remove, or the solvents degrade the polymer unduly, or are too corrosive, or are too expensive for commercial use.

Whether scrap nylon or virgin nylon is employed, there has been no feasible commercial means for reducing it to a usable fine powder. Nylon is so tough that it is impossible to grind it to a very small particle size. Molding powder consisting of relatively large particles in the order of $\frac{1}{8}''$ x $\frac{3}{16}''$ x $\frac{1}{8}''$ in size is produced commercially, but such particles are far larger than the 200 mesh or finer particles required for our purposes.

An object of this invention is to reduce nylon to a finely divided state.

Another object is to prepare nylon powder easily and without degradation of the polymer.

Still another object is to prepare nylon powder by employing polyhydroxy compounds which are solvents for nylon at elevated temperatures and non-solvents at room temperature.

These and other objects may be accomplished by dissolving the polyamide in a polyhydroxy compound under elevated temperatures, removing contaminating matter, if any, and precipitating the nylon as a fine powder by cooling. The precipitated nylon powder is separated from the major portion of the solvent mechanically and then completely freed from the remaining solvent by washing or by evaporation.

In carrying out this invention the nylon material is scoured to remove surface contamination and is introduced into the solvent and heated with agitation until the nylon dissolves. Extraneous matter, such as other fibers, delusterants and metals, if present, are removed by filtration or by centrifuging the solution. The solution is cooled to precipitate nylon as very fine particles. This nylon is washed to remove the solvent and dried. Any danger of oxidation during the process may be avoided by carrying out the process under nitrogen or any other suitable inert or non-oxidizing gas to provide non-oxidizing conditions.

The nylon preferably is prepared for solution by reducing it to chips or to a reasonable subdivision so that solution may be accomplished more quickly.

While up to about 36% nylon by weight may be introduced into solution, such solutions are viscous and when cooled form a very stiff pasty mass which is difficult to disperse in water in the subsequent washing operation. In order to obtain free-flowing solutions and easily washed fine subdivision of polymer it has been found that solutions containing 15% or less of nylon are preferred.

As indicated in the tables given below, the temperature at which nylon goes into solution varies somewhat with the particular solvent employed and the particular nylon, but all the solvents are polyhydric alcohols such as ethylene glycol, triethylene glycol, or glycerin. Because of its ease of removal, ethylene glycol is the preferred solvent. If desired, the solvent may be a mixture of glycols.

Precipitation of the nylon in the form of fine powder rather than as a gel in the case of the recognized solvents, thereby accomplishes fine division of the polymer. Precipitation is also accomplished merely by cooling the solution, thus eliminating any steps of diluting the mixture further with a non-solvent. The particle size of the reduced nylon varies but it all appears to be below 10 microns in diameter, and many of the particles are much smaller being in the order of 5 microns or less.

In Tables I and II below are given the temperatures at which polyhexamethylene adipamide and polyhexamethylene sebacamide go into solution in the various polyhydric alcohols.

The procedure consisted of mixing together chips of nylon with the solvent and slowly raising the temperature with continual stirring until the nylon was completely dissolved. Complete solvation occurred at the temperatures indicated. The solution when formed was allowed to cool and the nylon precipitated as an extremely fine powder. After separation from the bulk of the solvent the nylon was washed with water and recovered substantially free of solvent.

TABLE I

*Polyhexamethylene adipamide*

| Solvent | Temperature of Complete Solvation, °C. |
|---|---|
| Ethylene Glycol | 162 |
| Triethylene Glycol | 202 |
| Propylene Glycol | 158 |
| 1,3 Butylene Glycol | 162 |
| 1,5 Pentane Diol | 176 |
| Glycerine | 188 |

TABLE II

*Polyhexamethylene sebacamide*

| Solvent | Temperature of Complete Solvation, °C. |
|---|---|
| Ethylene Glycol | 160 |
| 1,5 Pentane Diol | 170 |
| Glycerine | 183 |

The polyhydric alcohols differ from the monohydric alcohols in that they are not solvents for nylon when mixed with water. In our copending application Ser. No. 91,638 it is disclosed that the lower alcohols dissolve nylon only when some water is present.

It can be readily appreciated that the process herein described is applicable to all simple linear polyamides which are normally considered insoluble in alcohols but are soluble in phenol. Polyamides fulfilling this description are of two types, those derived from polymerizable monamine carboxylic acids or their amide-forming derivatives, and those derived from the reaction of suitable diamines with suitable dicarboxylic acids. On hydrolysis with mineral acids, the polyamides yield monomeric amide-forming reactants. For example, a polyamide derived from a diamine and a dibasic acid yields on hydrolysis with hydrochloric acid the dibasic acid and diamine hydrochloride. Similarly, an amino-acid type polyamide yields an amine-acid hydrochloride.

In particular, this invention is concerned with the simple, unsubstituted polyamides, such as the polymers formed by the reaction of tetramethylene diamine with adipic acid, tetramethylene diamine with suberic acid, tetramethylene diamine with sebacic acid, hexamethylene diamine with suberic acid, hexamethylene diamine with sebacic acid, or the polymerization product of ε-caprolactam. The polymers all dissolve in phenol but not normally in alcohols. They do dissolve in the polyhydric alcohols described herein by the process of our invention. It also includes interpolymers which are normally considered insoluble in alcohols but are soluble in phenols.

Thus our invention is concerned with only those polyamides which are not soluble in methyl alcohol at the boiling point of methyl alcohol at normal pressures, i. e. 64° C., but which are soluble in phenol.

A further advantage in the use of polyhydric alcohols as solvents is the fact that they do not markedly decrease the molecular weight of the polymer as shown by calculations based on the standard intrinsic viscosity determination.

The fine nylon powder obtained by the above process may be employed in several different ways. The powder may be pelletized with or without the addition of some virgin nylon molding powder remelted and extruded. By pelletizing the recovered material and incorporating therewith virgin nylon, rod, strips and tubing an acceptable quality may be produced. If desired, the fine powder may be pressed into the desired shape and sintered. Because of the very small size of the particles, suspensions of the nylon may be prepared which are useful as a coating material.

Having thus described our invention, we claim:

1. The process of producing a finely divided simple synthetic linear polyamide which comprises forming a mixture of said polyamide with a liquid solvent, heating said mixture to a sufficient temperature to dissolve said polyamide to form a solution, cooling said solution to precipitate the polyamide as a finely divided powder, removing said solvent to recover finely divided polyamide and drying said polyamide, said heating, cooling, removing of solvent, and drying of said polyamide being carried out under conditions which will not cause oxidation of said polyamide, said liquid solvent consisting of a polyhydric alcohol, said polyamide being a simple unsubstituted polyamide soluble in phenol and insoluble in methyl alcohol at room temperature and being one which on hydrolysis with hydrochloric acid yields material selected from the group consisting of (a) amino carboxylic acid hydrochloride, and (b) mixtures of diamine hydrochloride and dibasic carboxylic acid.

2. The process according to claim 1 wherein the solvent is glycerine.

3. The process according to claim 1 where the solvent is a glycol.

4. The process according to claim 3 wherein the solvent is ethylene glycol.

5. The process according to claim 3 wherein the solvent is a polyethylene glycol.

6. The process according to claim 3 wherein the solvent is propylene glycol.

7. The process of producing finely divided polyhexamethylene adipamide which comprises forming a mixture of said polyhexamethylene adipamide with a liquid solvent, heating said mixture to a sufficient temperature to dissolve said polyamide to form a solution, cooling said solution to precipitate the polyamide as a finely divided powder, removing said liquid solvent to recover finely divided polyamide and drying said polyamide, said heating, cooling, removing of solvent, and drying of said polyamide being carried out under conditions which will not cause oxidation of said polyamide, said liquid solvent consisting of a polyhydric alcohol.

8. The process in accordance with claim 7 wherein the solvent is a glycol.

9. The process of producing finely divided polyhexamethylene sebacamide which comprises forming a mixture of polyhexamethylene sebacamide with a liquid solvent, heating said mixture to a sufficient temperature to dissolve said polyamide to form a solution, cooling said solution to precipitate the polyamide as a finely divided powder, removing said liquid solvent to recover finely divided polyamide and drying said polyamide, said heating, cooling, removing of solvent, and drying of said polyamide being carried out under conditions which will not cause oxidation of said polyamide, said liquid solvent consisting of a polyhydric alcohol.

10. The process in accordance with claim 9 wherein the solvent is a glycol.

11. The process of producing a finely divided simple synthetic linear polyamide which comprises forming a mixture of said polyamide with a liquid solvent, said polyamide and liquid solvent being in a weight ratio not greater than 15 to 100, heating said mixture to a sufficient temperature to dissolve said polyamide to form a solution, cooling said solution to precipitate the polyamide as a finely divided powder, removing said solvent to recover finely divided polyamide and drying said polyamide, said heating, cooling, removing of solvent, and drying of said polyamide being carried out under conditions which will not cause oxidation of said polyamide, said liquid solvent consisting of a polyhydric alcohol, said polyamide being a simple unsubstituted polyamide soluble in phenol and insoluble in methyl alcohol and being one which on hydrolysis with hydrochloric acid yields material selected from the group consisting of (a) amino carboxylic acid hydrochloride, and (b) mixtures of diamine hydrochloride and dibasic carboxylic acid.

LOUIS L. STOTT.
LAURENCE R. B. HERVEY.

References Cited in the file of this patent

UNITED STATES PATENTS

| Number | Name | Date |
|---|---|---|
| 2,279,771 | Austin | Apr. 14, 1942 |
| 2,359,878 | Schupp | Oct. 10, 1944 |
| 2,385,920 | Jenkins | Oct. 2, 1945 |

FOREIGN PATENTS

| Number | Country | Date |
|---|---|---|
| 548,560 | Great Britain | Oct. 15, 1942 |

OTHER REFERENCES

Carothers, "Collected Paper," Interscience, 1940, page 167.